United States Patent [19]
Iijima et al.

[11] 4,198,659
[45] Apr. 15, 1980

[54] VERTICAL SYNCHRONIZING SIGNAL DETECTOR FOR TELEVISION VIDEO SIGNAL RECEPTION

[75] Inventors: Hiroshi Iijima; Yasushi Sano, both of Tokyo, Japan

[73] Assignee: Nippon Electric Co., Ltd., Tokyo, Japan

[21] Appl. No.: 845,745

[22] Filed: Oct. 26, 1977

[30] Foreign Application Priority Data

Oct. 27, 1976 [JP] Japan ............................. 51-129009

[51] Int. Cl.² .................. H04N 5/06; H04N 5/04; H04N 5/08; H03B 3/04
[52] U.S. Cl. ................................ 358/150; 358/152; 358/153; 331/20
[58] Field of Search ............... 358/148, 152, 158, 17, 358/153, 150; 360/37; 331/20

[56] References Cited

U.S. PATENT DOCUMENTS

| | | | |
|---|---|---|---|
| 3,567,860 | 3/1971 | Oliver et al. | 358/158 X |
| 3,688,037 | 8/1972 | Ipn | 358/158 |
| 3,814,855 | 6/1974 | Kokado | 358/152 X |
| 3,906,155 | 9/1975 | van Straaten | 358/158 |
| 3,963,865 | 6/1976 | Songer | 360/37 X |

*Primary Examiner*—Benedict V. Safourek
*Assistant Examiner*—Aristotelis M. Psitos
*Attorney, Agent, or Firm*—Sughrue, Rothwell, Mion, Zinn and Macpeak

[57] ABSTRACT

A television video vertical sync detector which produces a vertical sync pulse. This detector includes a separating circuit for the production of horizontal sync pulses, equalizing pulses and vertical sync pulses, and a phase control oscillator. The phase control oscillator includes a phase comparator low pass filter, a voltage control oscillator for generating clock pulses, a division circuit and a delay circuit. A sampling circuit is used to generate the final vertical sync pulse.

2 Claims, 6 Drawing Figures

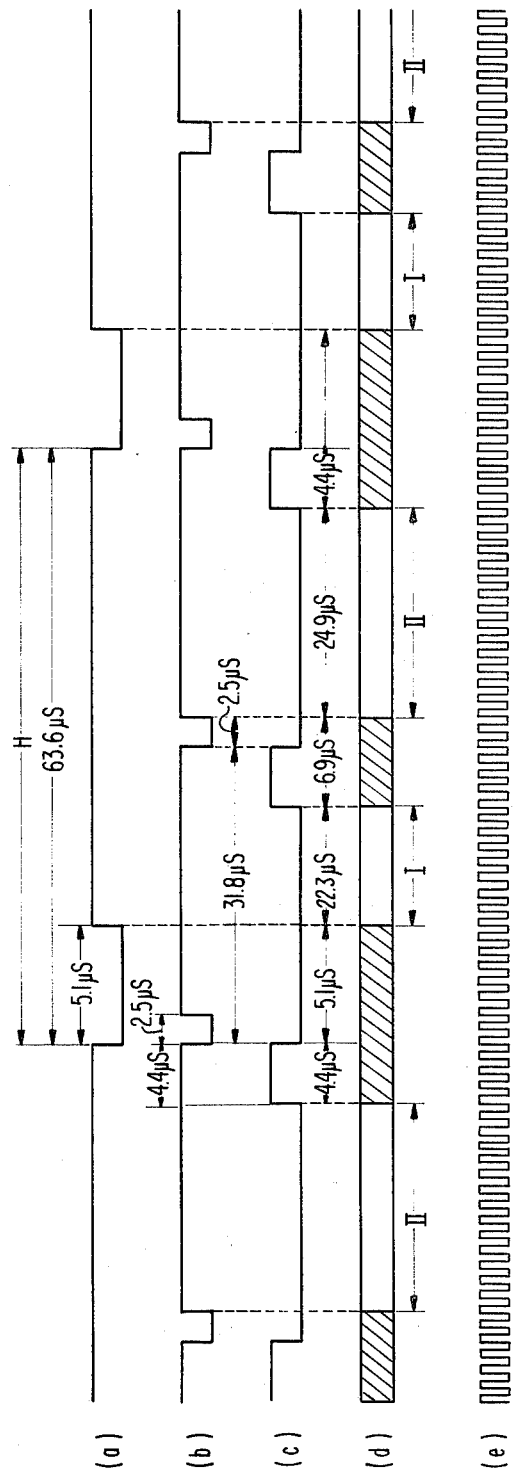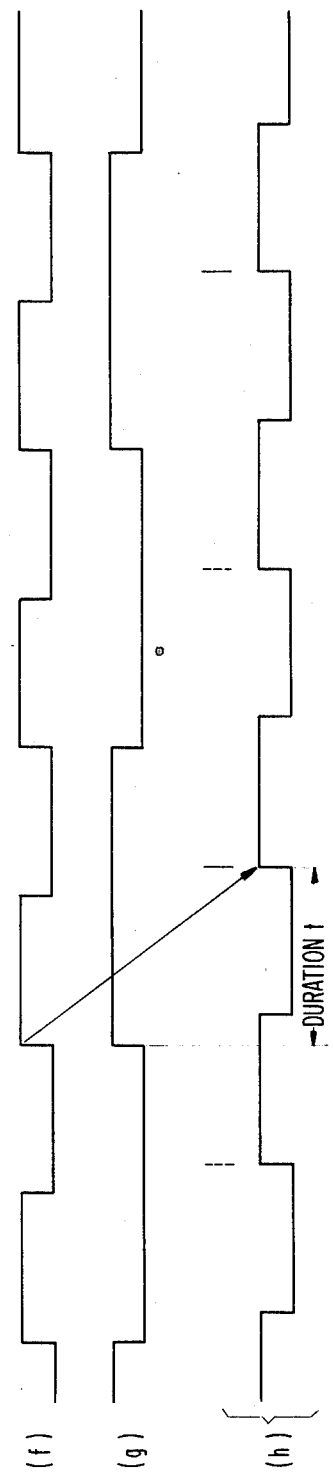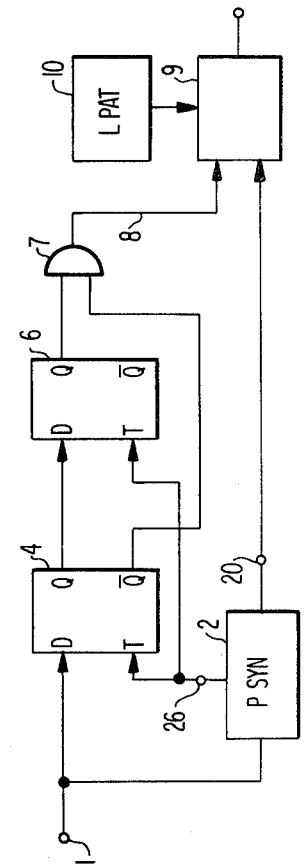
FIG 5
FIG 6

VERTICAL SYNCHRONIZING SIGNAL DETECTOR FOR TELEVISION VIDEO SIGNAL RECEPTION

BACKGROUND OF THE INVENTION

The present invention relates to a vertical synchronization (sync) signal detector for use in a television signal receiver for detecting vertical sync signals included in a composite sync signal which constitutes a part of a television video signal.

Separation of the vertical sync pulses and equalizing pulses from the composite sync signal which includes the horizontal sync pulses, has usually been accomplished with a CR integrating circuit having a relatively large time constant. The separating method is based on the fact that the vertical sync pulses, when integrated at the CR integrating circuit, result in a greater integrated voltage than that of the horizontal sync pulses because the former have greater width. Although this method is extensively used because of the simplicity of the circuit structure, it has a disadvantage because the accurate locating of the horizontal sync pulse becomes difficult. The presence of the sync pulses is detected depending on the gradually inclined charging curve formed by the integrating circuit.

Such a circuit is not applicable, in particular, to the interframe coding system for TV signals where fluctuation in the position of the vertical sync pulses causes a difference between the corresponding picture elements of the interframe even for a static. This results in a determination of transmission efficiency.

The details of the interframe coding system, is described in the "IEEE Transactions on Communications, Vol. Com-23, No. 12," December issue, 1975, pp. 1,461–1,466, and "Proceedings of the IEEE, Vol. 60, No. 7", July issue, 1972, pp. 792–799.

SUMMARY OF THE INVENTION

An object of the invention is, therefore, to provide a vertical sync signal detector for TV video signal reception free from the abovestated disadvantage and capable of accurately locating vertical sync signal out of the composite sync signals with a simplified circuit structure.

The present detector includes a phase-controlled oscillator which observes the respective levels of the horizontal sync, equalizing, and vertical sync pulses based on the horizontal sync. The oscillator generates timing pulses in each of the first and second regions of said period where none of the levels of the horizontal sync pulses, equalizing pulses and vertical sync serrations are. The detector also includes a sampling circuit responsive to said timing pulses for sampling said composite sync signal given.

This invention enables accurate locating of the vertical sync pulses.

The invention will be described in detail in conjunction with the accompanying drawings in which:

BRIEF DESCRIPTION OF THE DRAWINGS

FIGS. 4 and 5 show a diagram of the waveforms for explaining the operation of the embodiment; and FIG. 6 shows a block diagram of a practical example in which this invention finds application.

DETAILED DESCRIPTION OF THE INVENTION

Figure 1:
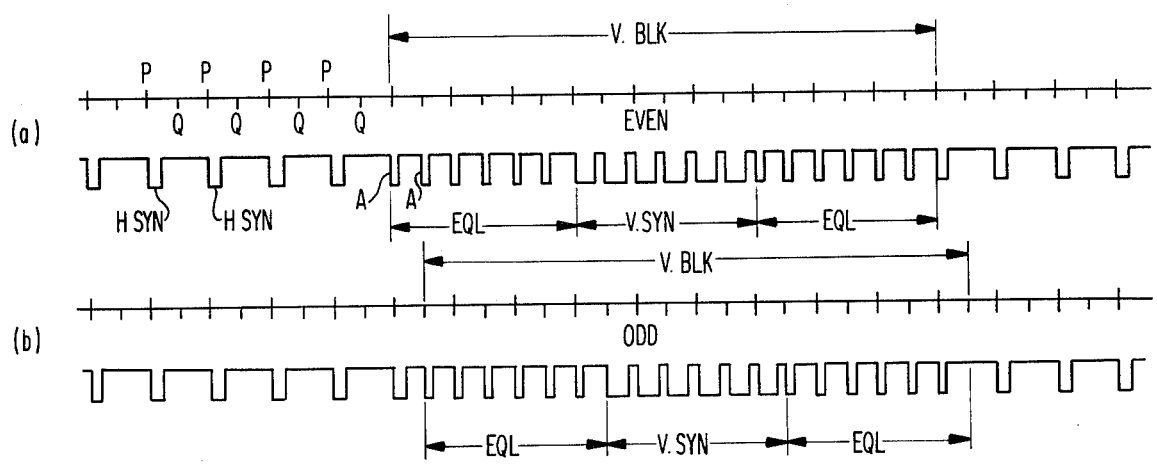
FIGS. 1 (a) through (b) show the waveforms of a composite sync signal included in a TV video signal.

FIGS. 1 (a) and (b), show the vicinities of the parts where vertical sync pulses are present in the odd and even fields, respectively, which constitutes a picture, namely, one frame. The vertical blanking part (V·BLK) of each field is composed of the vertical sync pulses (V·SYN) and the equalizing pulses (EQL) preceding and following the vertical sync pulses. The composite sync signal is deemed to be composed with reference to a point of time coincident with the leading edge of a horizontal sync pulse (P in the drawing, hereinafter called the "horizontal sync reference point"). If the recurring interval of this reference point P is represented by H and the point at a distance of H/2 from point P (hereinafter called the "horizontal sync median") by Q, the leading edge of the equalizing pulse (point A in FIG. 1 (a)) coincides with the median Q.

Figure 2:
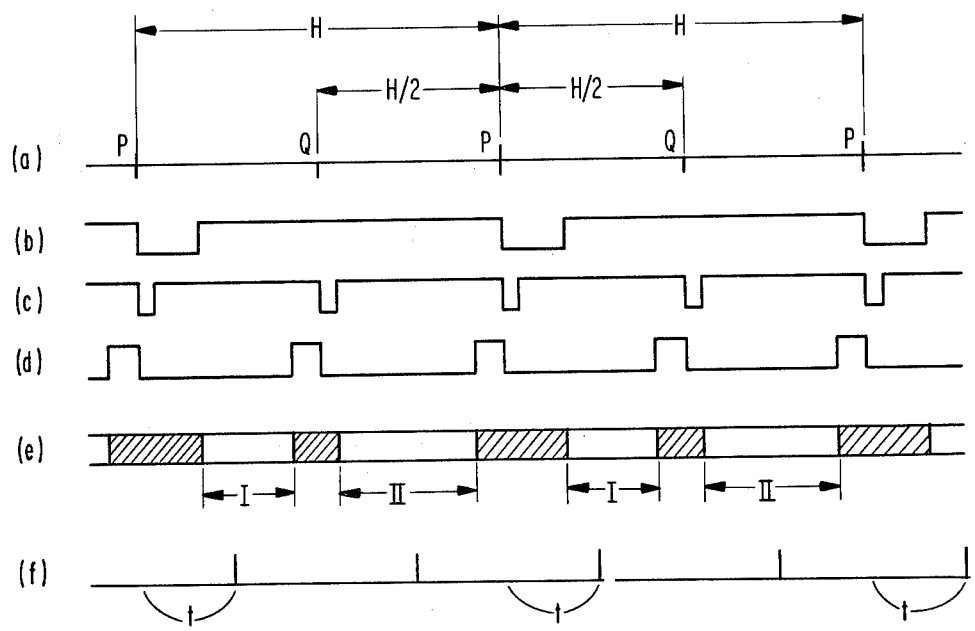
FIGS. 2 (a) through (f) show the waveforms of each constituent of the composite sync signal normalized in accordance with the period of horizontal sync pulses.

In FIG. 2 which shows the waveforms of the composite sync signals normalized with respect to said reference points P, (a) indicates the points P and the medians Q; (b) indicates the horizontal sync pulses; (c) indicates the equalizing pulses; and (d) indicates the vertical sync pulses. The periods in which the levels of the pulses of more than one kind of the horizontal sync pulses, equalizing pulses and vertical sync serrations are changed as viewed in the vertical direction with regard to FIGS. 2 (a) to 2 (d) are represented by hatchings in (e). By taking the period H of the horizontal sync pulses as the reference as indicated in FIG. 2 (e), the composite sync signal can be broken down into hatched regions which three times appear in each H period and unhatched regions which also occur twice in each H period. Whereas the respective levels of the composite sync signal are changed frequently in the hatched regions, in the unhatched regions the levels of those signals are kept at either the high or the low level. Furthermore, it is only for the vertical sync pulse that the composite sync signals are in the low level in the unhatched region. As shown in FIGS. 1 and 2, the vertical sync signal appears immediately after the final equalizing pulse falls into the low level in the first hatched region of FIG. 2 (e) where both the horizontal and vertical sync pulses take the low level. In contrast, since the vertical sync pulse is in the low level and other kinds of pulses are in the high level in the unhatched region I next to said hatched region, the starting point of the vertical sync signal can be assumedly set at a particular point within the region I which was delayed by the duration t (of FIG. 2 (f)) from the falling-edge point of the vertical sync pulse in the hatched region. This can be also understood easily by referring to FIGS. 4(a) to 4(c). As a result, if the levels of the composite sync signal are watched every time the unhatched region comes up and if the change in levels of these pulses from the high to the low level is observed in such a region, the starting point of the vertical sync pulse can be accurately located within the hatched region where the level change takes place.

Figure 3:
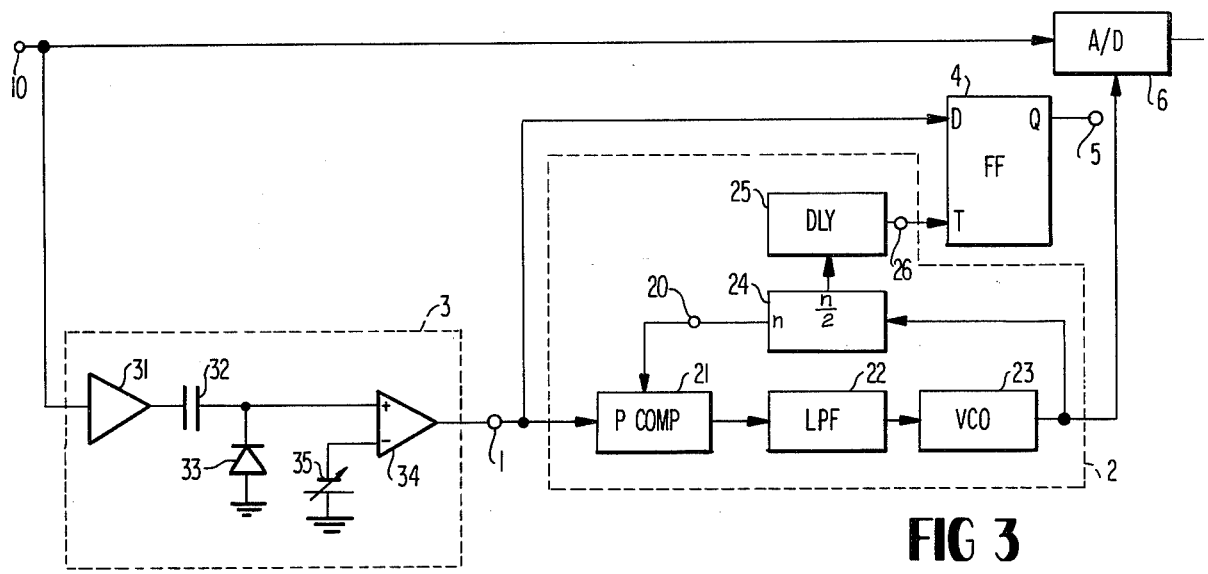
FIG. 3 shows a block diagram of one embodiment of the present invention.

Referring to FIG. 3, the present detector has an input terminal connected to separating circuit 3 for input of the composite sync signal separated from the TV video signal at terminal 10. The detector also has a phase controlled oscillator 2 for generating timing pulses having an interval equal to one half of the basic recurring interval H such as in regions I and II of FIG. 2 (e), a sampling circuit 4 for sampling said composite sync signals in response to the output pulses of the oscillator 2 and an output terminal 5 for producing the vertical sync pulse. The sampling circuit 4 consists of a well known D-type flip-flop having a terminal D for the composite sync signal input, a terminal T for input of the output pulses of the phase Controlled oscillator 2 and an output terminal Q. The D-type flip-flop 4 produces an output indicative of the level of an input composite sync signal fed to the terminal D onto the terminal Q every time a timing pulse is given from the circuit 24 to the terminal T so that the output indicative of said level can be kept until next timing pulse supply. In this way, the element 4 can respond to the respective levels of the composite sync signal.

The separating circuit 3 is composed of a buffer amplifier 31, a diode clamper consisting of a condenser 32 and a diode 33, a D.C. power source 35 for giving a reference voltage, and a comparator 34 for comparing the output signal of the diode clamper with the reference voltage of the source 35. Further details are not given here, because circuit 3 has no direct bearing on the gist of this invention.

The oscillator 2 includes a first output terminal 26 for producing the above-described timing pulses, a second terminal 20 for generating horizontal sync reference point pulses, a voltage-controlled oscillator 23 for generating clock pulses, a counter 24 for dividing the output pulses of the oscillator 23 and for generating local horizontal sync pulses and said timing pulses, a phase comparator circuit 21 for comparing the phases of said local sync pulses with the leading edge of the horizontal sync pulse, a low-pass filter 22 for suppressing high frequency components from the output signal of the phase comparator circuit 21 and for giving control signals to the voltage controlled oscillator 23, and a delay circuit 25 for delaying the timing pulses obtained by the circuit 24 to appropriate positions in the regions I and II indicated in FIG. 2 (f). For details of the respective structural elements of the phase-controlled oscillator 2, reference is made to "THE Bell System Technical Journal," March 1962, PP. 559–602. Also, an A/D converter 6 for converting the input analog TV video signal into a digital output signal operates under the control of clock pulses fed from the voltage-controlled oscillator 23 so as to provide a digital output signal for digital transmission.

Figure 4:
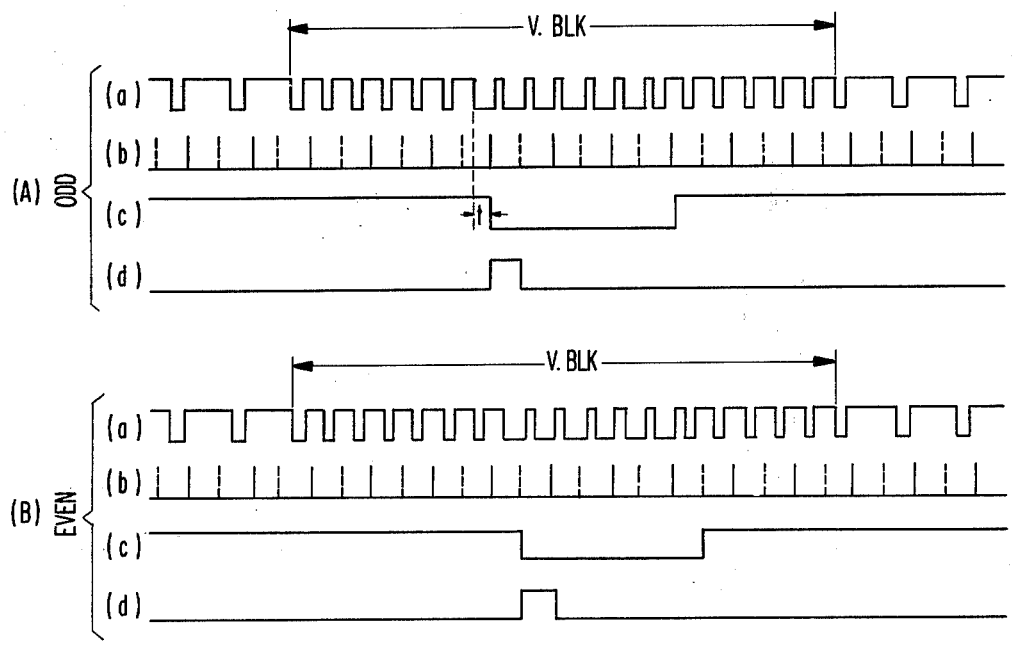

Next, the operation of the embodiment of this invention will be described more in detail by referring to FIGS. 3 to 5. The composite sync signal (see FIG. 4(A)(a) and FIG. 4(B)(a) is separated from the TV Video signal by the separating circuit 3 and is, then, given to the flip-flop 4 serving as the sampling circuit and also to the phase-controlled oscillator 2. The oscillator 2 produces a desired timing pulse as follows. First, a first-stage timing pulse (FIG. 5(f)) which is obtained by dividing by n/2 the clock pulses given from the oscillator 23 using the counter 24, is given to the delay circuit 25. After this, the desired timing pulse (FIG. 5(h)) is obtained by adding the duration t to said first-stage timing pulse. The delay period t should obviously be at least greater than the pulse width of the horizontal sync pulse to assure that the timing pulse will occur after the horizontal sync pulse has returned to its high level. On the other hand, the delay period is preferably also be less than the pulse width of the vertical sync pulse to assure that the timing pulse will occur before the vertical signal returns to its high level.

It is to be noted that the flip-flop 4 is actuated by the leading edge of the desired timing pulse rather than by the trailing edge. For this reason, only the part of the leading edge of that pulse is shown in FIG. 4(A)(b) and FIG. 4(B)(b). The output (FIGS. 4A(c) and 4B(c)) of the element 4 (D-type flip-flop) represents the vertical sync pulses detected from the composite sync signals which are separated from a given video signal. This means that the addition of the output of the element 4 into the composite sync signal is not needed at all.

Upon application of the desired timing pulse to the flip-flop 4, the vertical sync pulses (FIG. 4(A)(c) and 4(B)(c)) are detected, by the sampling operation by the flip-flop 4, from the composite sync signal appearing over the odd and even fields.

Although the point of time at which the vertical sync pulse is detected is behind the leading edge of the vertical sync pulse by t (see FIG. 4(A)(a) and FIG. 4(A)(c)), the duration t is equal to the extent to which the timing pulse of the region I is delayed in advance from the horizontal sync reference point P by the delay circuit 25 of FIG. 5. Since this duration t can be precisely determined, the leading edge of the vertical sync pulse is accurately located based on the detected leading edge of the vertical sync pulse.

The synchronization of the oscillator 2 with the horizontal sync pulse is completed when the oscillator 23 is placed under the control of the output signal of the phase comparator 21. The phase comparator compares the local horizontal sync pulses obtained by the n division of the clock pulses with the horizontal sync pulse included in the composite sync signal.

Pratical data for the above-mentioned embodiment is given in FIGS. 5(a) to 5(d). The period of the horizontal sync pulse is 63.6 microsecond ($\mu s$); the width of the horizontal sync pulse, 5.1 ($\mu s$); the duration of the existence of the equalizing pulses, (31.8 ($\mu s$); the width of the equalizing pulse, 2.5 ($\mu s$); the duration of the existence of the vertical sync pulses, 23 ($\mu s$); the width of the serration, 4.4 ($\mu s$); the oscillation frequency of the voltage-controlled oscillator 23, 6.293705 (MHz); the dividing ratio n of the counter 24, 400; and the duration t, b 41 ($\mu s$).

FIG. 6 shows a line counter sync circuit for use in an interframe coding system, which is one adaptation of this invention. This line counter sync circuit includes a detector of FIG. 3, which indicates the leading edges of the vertical sync pulses of the odd and even fields, a D-type flip-flop 6 and an AND gate 7. The line counter sync circuit generates load pulses (FIGS. 4 (A)(d) and 4(B)(d)) for synchronization of the line counter to be referred to below. A line counter 9 receives said load pulse, the horizontal sync reference point pulses from a second output terminal 20 of the phase controlled-oscillator 2, and the output of a load pattern generating circuit 10. The line counter counts said horizontal sync reference pulses and produces frame pulses and scanning line numbers. As soon as the line counter 9 has detected the coincidence of these load pulses and horizontal sync reference point pulses, a prescribed scanning line number is supplied to the counter 9 from the circuit 10. Since the scanning line number is set in the counter 9 in response to the coincidence of the horizontal sync reference point pulses and the leading edge pulses of the vertical sync pulses in either the even or the odd field, it can be determined whether the sync pulses are in the even field or in the odd field.

Such a counter 9 may be easily realized with the type of counter described in "Signetics Digital Linear MOS" issued in 1972 by Signetics Corporation, p. 2-138 to p. 2-143. The load pattern generator 10 is composed of a D.C. power source for supplying predetermined binary codes. This is the predetermined scanning line number in this particular example.

Thus, by combining the detector of this invention with said line counter, the line counter can be precisely synchronized at the horizontal sync reference point P with the vertical sync pulse of the composite sync signals given.

What is claimed is:

1. A detector for detecting television video vertical sync signals and generating a final vertical sync pulse comprising in combination:
   a separating circuit having an input connected to a source of television video vertical sync signals for separating a composite sync signal from said television video signal and having an output, said composite sync signal including horizontal sync pulses, equalizing pulses and vertical sync pulses which are based upon the horizontal synchronization;
   a phase controlled oscillator having an input connected to said separating circuit output and having an output, for generating timing pulses in each of first and second regions of said period where none of the levels of the horizontal sync pulses, equalizing and vertical sync pulses are changed; and
   a sampling circuit having a first input connected to said separating circuit output and a second input connected to said phase controlled oscillator output containing said timing pulses, for sampling said composite sync signal with said timing pulses and generating the final vertical sync pulse.

2. A detector for detecting television video vertical sync signals and generating a final vertical sync pulse comprising in combination:
   a separating circuit having an input connected to a source of television video vertical sync signals for separating a composite sync signal from said television video signal and having an output;
   a phase controlled oscillator having an input connected to said separating circuit output and having an output, for generating timing pulses; and
   a sampling circuit having a first input connected to said separating circuit output and a second input connected to said phase controlled oscillator output containing said timing pulses, for sampling said composite sync signal with said timing pulses and generating the final vertical sync pulse;
   said phase controlled oscillator comprising a phase comparator having an input connected to the output of said separating circuit for comparing a phase of local horizontal sync pulses with that of the horizontal sync pulses of said composite sync signal and further having an output; a low pass filter having an input connected to said phase comparator output for suppressing high-frequency components of the output of said phase comparator circuit and for producing control signals, and having an output; a voltage controlled oscillator having an input connected to said low pass filter output for generating clock pulses and having an output; means for dividing the output signal of said voltage controlled oscillator connected to said voltage controlled oscillator output for generating said local horizontal sync pulses and said timing pulses and having an output; and a delay circuit connected to the output of said means for dividing the output signal for generating said timing pulses in appropriate positions in the time regions where said horizontal sync and equalizing pulses are high, while said vertical sync pulse is low.

* * * * *

UNITED STATES PATENT AND TRADEMARK OFFICE
CERTIFICATE OF CORRECTION

PATENT NO. : 4,198,659  
DATED : April 15, 1980  
INVENTOR(S) : Hiroshi Iijima and Yasushi Sano It is certified that error appears in the above—identified patent and that said Letters Patent is hereby corrected as shown below:

Column 1, line 32- after "static" insert --image-- line 33- delete "determination" insert --deterioration-- line 34- after "system" comma should be deleted.

line 44- "above stated" should be hyphenated line 55- after "are" insert --changed--

Column 2, line 13- delete "(V*BLK)" insert --(V.BLK)-- line 15- delete "(V*SYN)" insert --(V.SYN)-- line 68- after "terminal" insert --1--

Column 3, line 12- delete "phase controlled" insert --phase-controlled-- line 46- delete "THE" insert --The-- line 47- delete "PP" insert --pp.-- line 57- delete "Video" insert --video--

Column 4, line 3- delete "be"

line 42- delete "(31.8" insert --31.8-- line 48- before "41" delete "b"

UNITED STATES PATENT AND TRADEMARK OFFICE
CERTIFICATE OF CORRECTION

PATENT NO. : 4,198,659

DATED : April 15, 1980

INVENTOR(S) : Hiroshi Iijima and Yasushi Sano

It is certified that error appears in the above—identified patent and that said Letters Patent is hereby corrected as shown below:

Column 4, line 59- insert hyphen between phase controlled.

line 59- delete hyphen between controlled and oscillator.

Column 5, line 34- after "ing" insert --pulses--

Signed and Sealed this

Twenty-ninth Day of July 1980

[SEAL]

Attest:

SIDNEY A. DIAMOND

Attesting Officer

Commissioner of Patents and Trademarks